May 10, 1949.

J. N. BAILEY 2,469,491

ADAPTER FOR CONVERTING KEROSENE
LAMPS INTO ELECTRIC LAMPS
Filed Dec. 12, 1947

INVENTOR.
James N. Bailey
BY
McMorrow, Berman & Davidson
Attorneys

Patented May 10, 1949

2,469,491

UNITED STATES PATENT OFFICE 2,469,491

ADAPTER FOR CONVERTING KEROSENE LAMPS INTO ELECTRIC LAMPS

James N. Bailey, Mobile, Ala.

Application December 12, 1947, Serial No. 791,362

2 Claims. (Cl. 240—37)

This invention relates to light fixtures, and more particularly to a combination kerosene and electric lamp which may be readily converted from a kerosene lamp to an electric lamp, or vice versa, that is, reverted back to a kerosene lamp when used as an electric lamp, without altering or modifying the structure of the kerosene lamp, and which may be so converted by a child.

Another object of the invention is to provide novel and simple means capable of application to a kerosene lamp to convert it into an electric lamp by removing the chimney and applying to the chimney holder of the kerosene lamp an adapter including an electric lamp socket adapted to hold a bulb, and having means similar to that on the burner of the lamp for holding the chimney, so that the kerosene lamp is capable of use as an electric lamp, and so that, due to current failure from any cause, such as hurricanes, floods, or otherwise, from its convenient and ready removal of the converter or adapter, to permit use of the kerosene lamp in the usual manner.

Another object of the invention is to provide an attachment for an ordinary kerosene or coal oil-burning lamp whereby it is adapted, without modification of the structure of the kerosene lamp, to permit the use and connection of an electric bulb, and having means for enclosing the same in the ordinary chimney of the kerosene lamp.

A still further object of the invention is to provide an attachment or adapter for an ordinary kerosene lamp of the type having a base or stand, a well or reservoir for kerosene, a burner thereon using a wick dipping into the kerosene, and a chimney holder frictionally holding the lamp chimney in position, so that by removing the chimney from the holder and applying the attachment thereto, the lamp may be converted to an electric lamp.

A still further object of the invention is to provide an attachment for converting a kerosene lamp into an electric lamp comprising a double hollow-walled sleeve or tube having a top plate supporting an electric light or bulb-receiving socket provided with an extension cord having a plug adapted to be connected to a wall socket, said sleeve being held in the chimney holder of a kerosene lamp and covering the latter to preclude the same from view when used as an electric lamp, and having a chimney holder similar to the holder provided on the kerosene lamp to receive and hold the chimney over the electric light socket and bulb to present an attractive appearance and provide for the use of either source of light as occasion may require.

Other objects and advantages reside in the details of construction and operation as more fully hereinafter described and claimed, reference being had to the accompanying drawings forming part hereof, wherein like numerals refer to like parts throughout, and in which:

Figure 1:
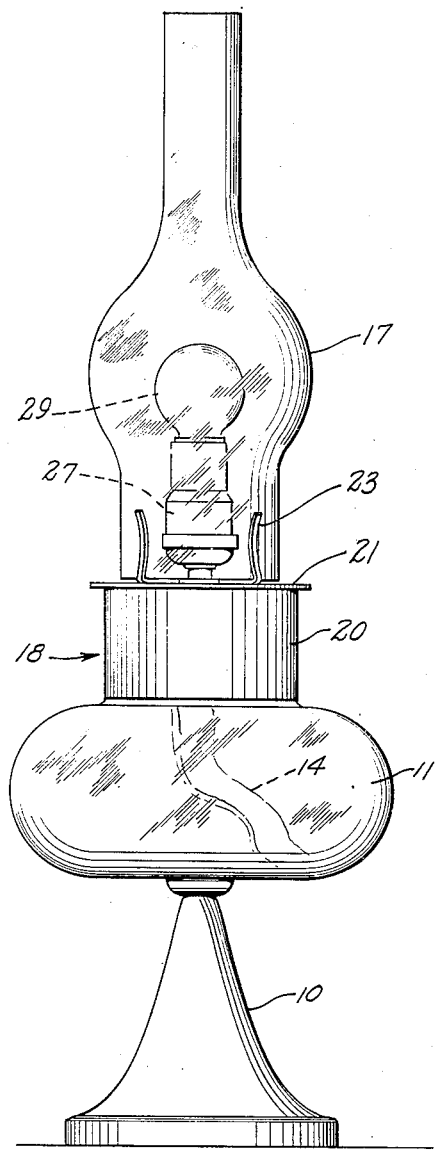
Figure 1 is a side elevation of a kerosene lamp converted into an electric lamp in accordance with the invention.
Figure 2:
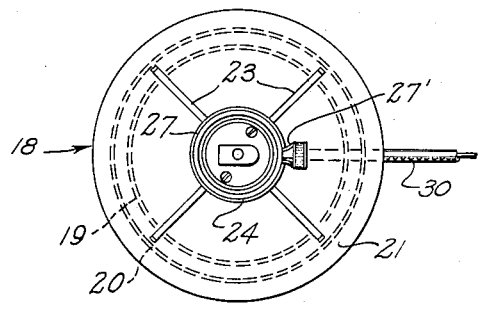
Figure 2 is a top plan view of the adapter for converting the kerosene lamp into an electric lamp.

Referring to the drawings in detail, in which like reference characters designate corresponding parts throughout the several views, there is shown a kerosene lamp having a base or stand 10 on which is supported a well or reservoir 11 within the filling opening and neck of which a sleeve 12 of the usual burner 13 for burning kerosene by means of a wick 14 is secured by any suitable means, such as a set screw 15. The burner 13 is provided with chimney-holding means of any suitable character, including spring arms or fingers 16, within which the ordinary chimney 17 of transparent glass or otherwise, is designed to be frictionally held.

Figure 3:
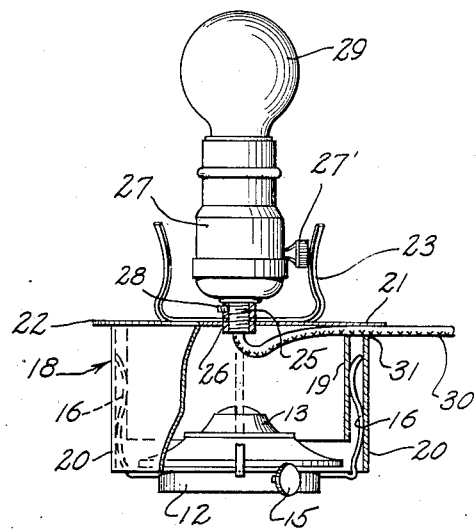
Figure 3 is a side elevation of the structure shown in Figure 2, partly broken away and in section.

When it is desired to convert the kerosene lamp into an electric lamp, an adapter 18 is employed comprising a hollow double-walled member having an interior circular sleeve or wall 19 and a longer outer circular wall or sleeve 20 depending below the open bottom edge of the wall 19 and also likewise open at its lower end. These walls are held in spaced concentric relation, as by attachment to a top plate 21 of circular or other design, which may be formed of suitable sheet metal, such as aluminum, or molded as a single piece in an integral construction, or made of suitable plastic, with its marginal portion or edge 22 projecting outwardly from the wall 20, if desired. Upon the top or plate 21 is provided a suitable chimney holder for the chimney 17, such as spring arms or fingers 23, suitably anchored to the plate 21 constituting the top or cover of the adapter, and branching, if desired, from an annular attaching member or ring 24 which may be anchored in position to a nipple 25 extending through a central opening in the plate 21 and secured, as by means of a nut 26. The nipple 25 is designed to hold an electric light socket 27 having the usual switch-actuating knob 27' suitably secured thereon, as by means of the usual screw 28, through the neck of the socket, which latter is designed to take an electric light bulb 29. Thus, by removing the chimney 17 from the holder of the kerosene lamp, that is, from within the spring arms or fingers 16, and placing the adapter 18 thereover so that the inner wall 19 frictionally engages within said arms or fingers 16, as shown in Figure 3 of the drawings, and with the outer wall 20 extending outwardly of said arms or fingers 16, the latter are precluded from view with the lower edge of the outer wall 21 resting upon the well or reservoir 11 around the burner 13 and supporting the lamp and holder for the chimney in position so that the chimney 17 may be applied thereto for use of the electric lamp in place of the kerosene lamp. An extension cord or wire 30 leads from the socket 27 down through the nipple 25 and ring nut 26, and may be extended through an opening 31 in each of the walls 19 and 20 near the top 21, and provided with the usual plug for insertion in the wall socket of the house wiring for supplying current to the bulb of the electric lamp.

Thus, at times when there is a current failure, for any reason, such as due to a hurricane, a floor, or otherwise, the lamp may be readily converted from an electric lamp into a kerosene lamp to provide the necessary lighting facilities. However, by merely removing the adapter with the chimney and applying the chimney to the spring arms or fingers 16 of the kerosene lamp, the kerosene lamp is usable in the ordinary way without alteration of its structure, so that by the simple application of the adapter, the kerosene lamp may be converted into an electric lamp of attractive appearance and practical use. The device is extremely simple in construction and may be readily converted by a child, in addition to being economical to manufacture so as to be sold for a price well within the reach of any one.

From the foregoing it will now be seen that there is herein provided a device which accomplishes all the objects of this invention, and others, including many advantages of great practical utility and commercial importance.

I claim:

1. A device for converting a kerosene lamp into an electric lamp in which the kerosene lamp is provided with the usual kerosene well and a burner mounted thereon having a wick dipping in the kerosene in the well, and chimney-holding spring fingers projecting upwardly therefrom to take the neck of a chimney, comprising a double-walled structure in which the walls are spaced apart in concentric relation, a top over said walls having a central opening, a light socket supported in said latter opening to receive an electric light bulb, said walls adapted to frictionally engage over the spring fingers and rest on the well around the burner to preclude the latter from view, and chimney-holding fingers on the top over said walls to receive the neck of the chimney therein around the socket and bulb.

2. A device for converting a kerosene lamp into an electric lamp in which the kerosene lamp is provided with the usual kerosene well and a burner mounted thereon having a wick dipping in the kerosene in the well, and chimney-holding spring fingers projecting upwardly therefrom to take the neck of the chimney, comprising a double-walled structure in which the walls are spaced apart in concentric relation, a top over said walls having a central opening, and a light socket supported in said latter opening to receive an electric light bulb, said walls adapted to frictionally engage over the spring fingers and rest on the well around the burner to preclude the latter from view.

JAMES N. BAILEY.

REFERENCES CITED

The following references are of record in the file of this patent:

UNITED STATES PATENTS

| Number | Name | Date |
| --- | --- | --- |
| 716,043 | Hufschmitt | Dec. 16, 1902 |

FOREIGN PATENTS

| Number | Country | Date |
| --- | --- | --- |
| 368,150 | Germany | Feb. 1, 1923 |
| 548,006 | France | Oct. 9, 1922 |